United States Patent [19]

Marsee et al.

[11] 4,395,876
[45] Aug. 2, 1983

[54] VARIABLE SECONDARY AIR SYSTEM FOR AN ENGINE

[75] Inventors: Frederick J. Marsee, Clawson, Mich.; Jeffrey C. Hamilton, Waterloo, Iowa

[73] Assignee: Ethyl Corporation, Richmond, Va.

[21] Appl. No.: 814,463

[22] Filed: Jul. 11, 1977

Related U.S. Application Data

[63] Continuation-in-part of Ser. No. 701,097, Jun. 30, 1976, abandoned.

[51] Int. Cl.³ .................................................. F01N 3/22
[52] U.S. Cl. .......................................... 60/284; 60/289
[58] Field of Search ............... 60/282, 288, 289, 290, 60/286, 285, 284; 123/119 R, 97 B

[56] References Cited

U.S. PATENT DOCUMENTS

| | | | |
|---|---|---|---|
| 3,106,820 | 10/1963 | Schaffer | 60/290 |
| 3,282,261 | 11/1966 | Bartholomew | 123/119 R |
| 3,554,173 | 1/1971 | Masaki | 123/97 B |
| 3,577,727 | 5/1971 | Warren | 60/282 |
| 3,673,994 | 7/1972 | Aono | 123/97 B |
| 3,745,768 | 7/1973 | Zechnall | 60/285 |
| 3,826,089 | 7/1974 | Nakajima | 60/289 |
| 3,869,858 | 3/1975 | Goto | 60/290 |
| 3,902,853 | 9/1975 | Marsee | 60/322 |
| 3,972,184 | 8/1976 | Warren | 60/288 |
| 3,982,397 | 9/1976 | Laurent | 60/286 |
| 3,983,697 | 10/1976 | Goto | 60/290 |
| 3,986,352 | 10/1976 | Casey | 60/289 |

*Primary Examiner*—Douglas Hart
*Attorney, Agent, or Firm*—Donald L. Johnson; Joseph D. Odenweller; John F. Hunt

[57] ABSTRACT

Hydrocarbon and carbon monoxide emission of an internal combustion engine fitted with a non-catalytic thermal exhaust reactor is substantially lowered by operating the engine lean during normal modes of engine operation and switching to rich operation during idle using restricted air injection such that the idle exhaust contains about 2-5 volume percent oxygen.

8 Claims, 7 Drawing Figures

VARIABLE SECONDARY AIR SYSTEM FOR AN ENGINE

CROSS-REFERENCE TO RELATED APPLICATION

This application is a Continuation-in-Part of Ser. No. 701,097, filed June 30, 1976 now abandoned.

BACKGROUND

During recent years there has been an extensive effort to lower the amount of hydrocarbon and carbon monoxide emitted to the atmosphere by internal combustion engines. Substantial reductions have been achieved by such means as using lean air/fuel mixtures, injecting air into hot exhaust, replacing the exhaust manifold with a thermal reactor or placing a catalytic reactor in the exhaust system. Use of an exhaust catalyst is generally more effective if the engine is operated on lead-free or low-lead (i.e., tetraethyllead) gasoline. Thermal exhaust reactors are effective no matter what type of gasoline is used. Thus, there are substantial economic benefits which are achieved by use of a thermal reactor rather than a catalytic reactor.

Thermal reactors in which the hot exhaust passes from the exhaust port into an enlarged, usually insulated chamber are quite effective during normal modes of engine operation. These are generally used in conjunction with air injection using lean air/fuel mixtures. One problem encountered with such lean systems is that during idle the amount of carbon monoxide in the exhaust is too low to provide sufficient combustion heat to keep the thermal reactor and related hardware at a sufficiently high temperature. Furthermore, if unrestricted air injection is used during all modes of engine operation the amount injected at idle can be so excessive that the air cools the exhaust mixture below combustion temperature thus allowing the exhaust passage and thermal reactor to cool. The result of this is that when the engine shifts into an operating work load the thermal reactor is initially ineffective because of its temperature which permits increased amounts of hydrocarbon and carbon monoxide to be exhausted.

SUMMARY

According to the present invention, an internal combustion engine is provided which operates at lean air/fuel ratios with restricted air injection into the exhaust under normal operating modes. However, at idle the inducted air/fuel mixture is enriched such that the idle exhaust, in the absence of air injection, would contain about 0.5–1.5 vol percent carbon monoxide. In combination with this idle enrichment, restricted air injection into the idle exhaust is provided such that the resultant idle exhaust after reaction contains only about 2–5 vol percent oxygen. The combination of enriched idle mixture and limited air injection has a substantial effect on increasing the amount of sensible heat in the exhaust system during idle such that when the engine is again placed under normal work load using a lean air/fuel mixture the thermal reactor is immediately effective in burning exhaust hydrocarbon and carbon monoxide.

DESCRIPTION OF THE PREFERRED EMBODIMENTS

A preferred embodiment of the invention is an improvement in a spark-ignited, internal combustion engine wherein the engine includes air/fuel induction means and means for injecting air into the hot engine exhaust. According to the present improvement the air/fuel induction means provides a lean air/fuel mixture above about 15.5:1 during operation of the engine under normal operating modes after warm-up. During idle the air/fuel induction means changes such that it provides a rich air/fuel mixture such that the resultant exhaust gas during idle would contain, in the absence of air injection, about 0.5–1.5 vol percent carbon monoxide. Means for restricting air injection into the exhaust gas during idle are provided such that the amount of oxygen in the resultant exhaust gas after oxidation contains about 2–5 volume percent oxygen.

A further embodiment of this invention is an improvement in a spark-ignited, internal combustion engine wherein the engine includes means for injecting air into the hot engine exhaust, means for inducting a lean air/fuel mixture having an air/fuel ratio above about 15.5:1 during operation at normal operating temperature and means for enriching the air/fuel mixture while the engine is below operating temperature until the engine attains a warmed-up condition. According to this improvement air injection on cold start and during warm-up is equal to about 30–60 volume percent of inducted air which is modulated back to about 0–20 volume percent of inducted air when the engine reaches a predetermined normal operating temperature at which temperature lean air/fuel induction resumes.

Figure 1:
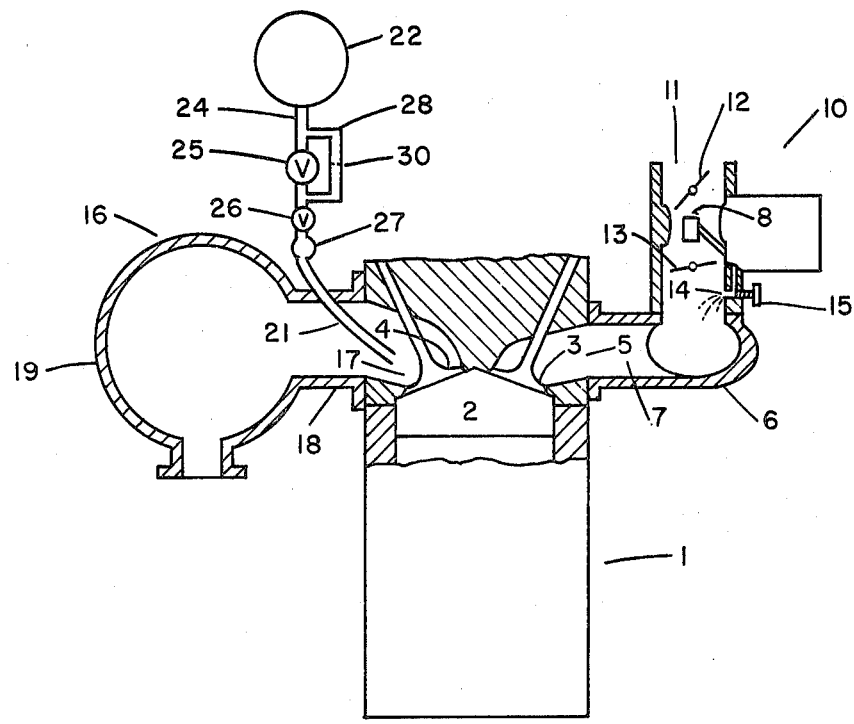
FIG. 1 is a partial cross-section of an engine including the intake and exhaust system.
Figure 2:
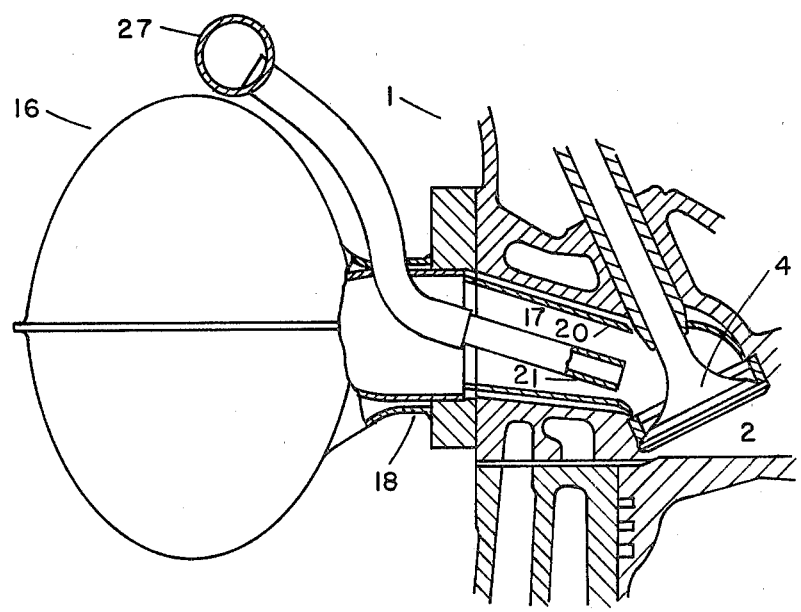
FIG. 2 is a cross-section showing in more detail the exhaust structure.

The embodiment shown in FIGS. 1 and 2 comprises a spark-ignited, internal combustion gasoline engine 1 having a combustion chamber 2, an intake valve 3, and an exhaust valve 4. Intake port 5 connects to intake manifold 6 through intake branches 7. Carburetor 10 is mounted on intake manifold 6. Primary barrel 11 includes choke valve 12, main air/fuel nozzle 8, throttle plate 13 and idle enrichment nozzle 14, which is controlled by needle valve 15.

Thermal reactor 16 connects to exhaust ports 17 through exhaust branch 18. In FIG. 1, the exhaust reactor is an enlarged cast iron housing 19. In FIG. 2 reactor 16 is constructed of double-walled sheet metal forming an enlarged reactor chamber. By enlarged is meant that it has more cross-sectional area and volume compared to a conventional exhaust manifold. Such thermal reactors are well known and are typified by U.S. Pat. Nos. 3,635,031, 3,653,205, 3,703,083 and 3,751,920 incorporated hereby by reference.

In FIG. 2, exhaust port 17 is fitted with exhaust port liner 20 which serves to conserve exhaust heat. Air injection nozzle 21 extends into exhaust port 17 to a location proximate to exhaust valve 4. Air pump 22 supplies air to air injector 21 through air conduit 24, valve 25, valve 26, and air manifold 27. Connected in parallel with valve 25 is by-pass conduit 28, in which is located restrictive orifice 30. This restrictive orifice may be provided by any small opening such as a needle valve, a small venturi or nozzle, an inserted plug having a small opening drilled through it, a fritted disc or porous plug or any such equivalent means.

On start-up, valves 25 and 26 are open to supply a full charge of air to exhaust port 17. This is because the carburetor choke valve 12 will be closed and the initial exhaust gas contains large amounts of unburned hydrocarbon and carbon monoxide requiring large amounts of injected air to burn them in the exhaust port and thermal reactor. This full charge of air should be equal to about 30 to 60 vol percent of inducted air. After the engine attains normal operating temperature the carburetor choke valve 12 will open and valve 25 close. Closing of valve 25 can be actuated by an engine temperature sensor or can be interlocked with the choke so that opening of the choke causes valve 25 to close. When the choke opens the carburetor is then supplying a lean air/fuel mixture to the engine cylinders having an air/fuel ratio above about 15.5:1 and preferably above 16:1. A large excess of air injection during normal engine operation is to be avoided as it cools the exhaust and quenches the oxidation. In practice, it has been found that with lean air/fuel mixtures, low hydrocarbon and carbon monoxide emissions can be obtained without any air injection. This can be accomplished by merely disengaging air pump 22. Alternatively, valve 26 can be closed after the choke opens. Preferably a small amount of air injection is continued during lean warmed-up operation of the engine. This can be readily provided by continuing the restricted air injection supplied at idle during normal warmed-up operation of the engine. This will be discussed next below. This small amount of air injection is preferably metered through an orifice. This orifice will provide air injection during normal warmed-up operation equal to up to about 20 volume percent of inducted air. The range of air injection during normal warmed-up operation of the engine at lean air/fuel ratios is about 0-20 volume percent of inducted air and preferably 5-20 volume percent.

When the engine comes to idle the air/fuel mixture supplied to the cylinders is enriched. One means for accomplishing this is by adjusting idle valve 15 so that the exhaust gas in the absence of any air injection would contain about 0.5-1.5 vol percent carbon monoxide. Any other means for enriching the air/fuel mixture during idle can be used.

Figure 3:
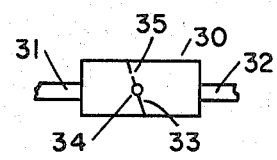
FIG. 3 is a schematic cross-section of a valve used for restricted air injection.

In conjunction with idle enrichment, the air injected into the exhaust ports is restricted by orifice 30. This restriction is such that the resultant exhaust gas leaving the thermal reactor contains about 2-5 vol percent oxygen. To accomplish this, the amount of air injected into the idle exhaust is generally restricted to about 5 to 20 vol percent of the inducted air. Best results have been achieved by restricting air injection to 12-15 vol percent of inducted air at idle. Part of the oxygen in the injected air is consumed in oxidizing hydrocarbons and carbon monoxide such that the resultant exhaust gas at idle contains only about 2-5 vol percent oxygen. While injecting restricted air at idle, valve 25 remains closed and valve 26 if closed must then be opened. Alternatively, by-pass conduit 28 can be eliminated and valve 25 modified such that it still passes a restricted amount of air when in the closed position. This can be accomplished by such means as placing a stop in the valve to prevent complete closure or drilling a small opening through the valve gate such that when valve 25 is open it allows passage of air equal to about 30-60 vol percent of inducted air and when valve 25 is closed it allows passage of air equal to about 5-20 vol percent of inducted air. FIG. 3 shows schematically such a valve. It comprises valve body 30 having air inlet 31 and outlet 32. Within body 30 is butterfly valve 33 which pivots on shaft 34. Valve 33 is shown closed. A small opening 35 permits air to leak through the closed valve in an amount to provide air injection equal to about 5-20 volume percent, more preferably 12-15 volume percent, of inducted air.

Valve 25 is then provided with means to cause it to open when the engine is below a pre-determined normal operating temperature and to close when the engine is above a pre-determined operating temperature. The engine will receive full air injection during warm-up and a restricted amount of about 5-20 vol percent of inducted air during remaining periods of engine operation.

Use of enrichment at idle in conjunction with restricted air injection maintains an oxidizing reaction in the exhaust port and thermal reactor even at idle such that the system temperature does not drop below spontaneous oxidation conditions. This results in immediate functioning of the oxidizing system when normal lean engine operation resumes. In conventional systems that maintain lean mixtures at idle and/or use unrestricted air injection, the idle exhaust temperature drops to such an extent that the thermal reactor is inoperable during the initial period of subsequent normal engine operation. Lean mixtures during idle do not supply sufficient combustible products in the exhaust. Unrestricted air injection cools, dilutes and quenches the oxidation reaction during idle.

The present system which provides lean engine operation with 0-20 vol percent air injection during normal warmed-up engine operation and a rich idle mixture with restricted air injection during idle results in a sharp drop in exhaust emission as measured by the 1975 Federal CVS Test Procedure. This is shown in tests conducted with an automobile having a 4-cylinder, 2 liter in-line engine fitted with exhaust port liners, an exhaust thermal reactor and an air/fuel induction system as described in U.S. Pat. No. 3,972,324. The carburetor was adjusted to give a 15.5-16:1 air/fuel ratio during normal operation.

In the first series of tests the temperature, hydrocarbon and carbon monoxide of the engine exhaust were measured at idle and various engine speeds without injecting any secondary air. All measurements were made after the engine stabilized at each operating mode. Idle enrichment was provided (note the volume percent CO at idle). This test was for comparative purposes and was not to demonstrate the present improvements since it did not employ air injection even during idle. The results are shown in Table 1.

TABLE 1

| | Without Air Injection | | | | | | |
| --- | --- | --- | --- | --- | --- | --- | --- |
| | | Engine Speed (mph) | | | | | |
| | idle | 15 | 20 | 25 | 30 | 40 | 50 |
| Exhaust Temp. (°F.) | 785 | 898 | 945 | 995 | 1062 | 1148 | 1325 |
| Hydro- | | | | | | | |

TABLE 1-continued

| | Without Air Injection | | | | | | |
|---|---|---|---|---|---|---|---|
| | Engine Speed (mph) | | | | | | |
| | idle | 15 | 20 | 25 | 30 | 40 | 50 |
| carbon (ppm) | 77 | 21 | 16 | 24 | 10 | 10 | 8 |
| CO (vol. %) | 1.67 | 0.35 | 0.17 | 0.35 | 0.084 | 0.028 | 0.028 |

In the next test the same sequence was carried out except that full unmodulated air injection was used. These results are reported in Table 2.

TABLE 2

| | Unrestricted Secondary Air | | | | | | |
|---|---|---|---|---|---|---|---|
| | Engine Speed (mph) | | | | | | |
| | idle | 15 | 20 | 25 | 30 | 40 | 50 |
| % Air Inj. | 49 | 58.4 | 49.7 | 54.4 | 51.6 | 46.8 | 41.8 |
| Exhaust Temp. (°F.) | 804 | 839 | 882 | 915 | 980 | 1055 | 1244 |
| Hydrocarbon (ppm) | 24 | 25 | 22 | 20 | 15 | 12 | 10 |
| CO (vol. %)[1] | .507 | .174 | .150 | .154 | .127 | .161 | .119 |

[1]corrected for dilution by injected air.

In the above tests limited reduction in hydrocarbon and carbon monoxide was achieved at idle, but at other modes no substantial reduction was noted.

In the next test series air injection was restricted by an orifice placed in the air supply conduit such that the idle exhaust contained 2.5% oxygen. Air injection during other modes was restricted by the same orifice. These results which are attributable to the present invention are shown in Table 3.

TABLE 3

| | Restricted Secondary Air | | | | | | |
|---|---|---|---|---|---|---|---|
| | Engine Speed (mph) | | | | | | |
| | idle | 15 | 20 | 25 | 30 | 40 | 50 |
| % Air Inj. | 15.4 | 12.3 | 12.4 | 12.9 | 11.9 | 8.8 | 11.2 |
| Exhaust Temp. (°F.) | 850 | 905 | 942 | 960 | 1040 | 1155 | 1320 |
| Hydrocarbon (ppm) | 18 | 18 | 16 | 14 | 13 | 13 | 13 |
| CO (vol. %)[1] | 0.13 | .094 | .063 | .063 | .031 | .030 | .031 |

[1]corrected for dilution by injected air.

The above results show the substantial reduction of hydrocarbon and very sharp drop in carbon monoxide when using restricted air injection compared to no air or unrestricted air.

The above results were measured after the engine was stabilized at each mode. The benefits attributable to the present invention become even more apparent when emissions are measured under dynamic conditions. These tests were conducted according to the 1975 Federal CVS Test Procedure.

In CVS Test No. 4 the engine was operated lean (air/fuel ratio 15.5-16:1) except while the choke was on during warm-up. No idle enrichment or air injection was used.

In CVS Test No. 5 the engine was again operated lean except when the choke was on during warm-up. No idle enrichment was used but unrestricted air injection (equal to 40-60 volume percent of inducted air) was used throughout the test.

In CVS Test No. 6 the engine was operated lean except when the choke was on during warm-up. There was no idle enrichment. Unrestricted air injection (40-60 volume percent of inducted air) was used during the first 4 minutes of the test (warm-up period). No air injection was used after this. This test demonstrates the improvement due to one embodiment of the invention using unrestricted air during warm-up and either no air or restricted air after warm-up.

In CVS Test No. 7 the engine was operated lean except when the choke was on during warm-up. Idle enrichment was used to provide 1 percent CO in the idle exhaust without air injection. Unrestricted air injection was used during warm-up (40-60 volume percent) and restricted air injection was used during idle such that the idle exhaust contained 2.5% oxygen. The restriction was provided by placing an orifice in the air conduit. This orifice remained in place during the remaining test procedure such that restricted air was provided through the same orifice during all other warmed-up modes of the test.

The results of the above four CVS tests are shown in Table 4.

TABLE 4

| | 1975 Federal CVS Tests | | |
|---|---|---|---|
| | Exhaust Emission (g/mi) | | |
| Test No. | Hydrocarbon | CO | $NO_x$ |
| 4 | 0.42 | 4.68 | 1.64 |
| 5 | 0.42 | 4.19 | 1.69 |
| 6 | 0.23 | 2.70 | 1.63 |
| 7 | 0.10 | 2.09 | 1.81 |
| 1976 Federal Std. | 1.5 | 15.0 | 3.4 |
| Pending Federal Std. | .41 | 3.4 | .41 |

Test Numbers 4 and 5 are for comparative purposes since they do not show the improved features of the present invention. Test No. 6 shows the sharp reduction in hydrocarbon and carbon monoxide which can be obtained with only one embodiment of the present invention, that is, unrestricted air injection during warm-up only with no air or restricted air after warm-up.

Test No. 7 shows the still further reductions of hydrocarbon and carbon monoxide which can be achieved using a further embodiment of the invention which includes idle enrichment and restricted air injection during idle. The improvements provided by the present invention readily enable the engine to pass 1976 Federal Emission Standards and to pass the pending statutory hydrocarbon and carbon monoxide standards proposed for the future.

The system described is readily adapted to use in a 3-valve engine. Such engines have an intake valve to the combustion chamber through which the main lean ($\geq 17:1$) air/fuel mixture is inducted. Such lean charges are difficult to ignite. A small torch chamber is appended to the combustion chamber. The torch chamber includes a spark plug and a small intake valve which inducts a rich ($\leq 14.5:1$) air/fuel mixture. The spark plug ignites the rich mixture in the torch chamber which blows into the combustion chamber to ignite the main lean air/fuel charge.

When used with such systems the idle enrichment is introduced into the main air/fuel mixture to provide an idle exhaust gas which in the absence of air injection would contain about 0.5-1.5 volume percent carbon monoxide. Air injection at idle is modulated such that the resultant idle exhaust contains 2-5 volume percent oxygen.

Figure 4:
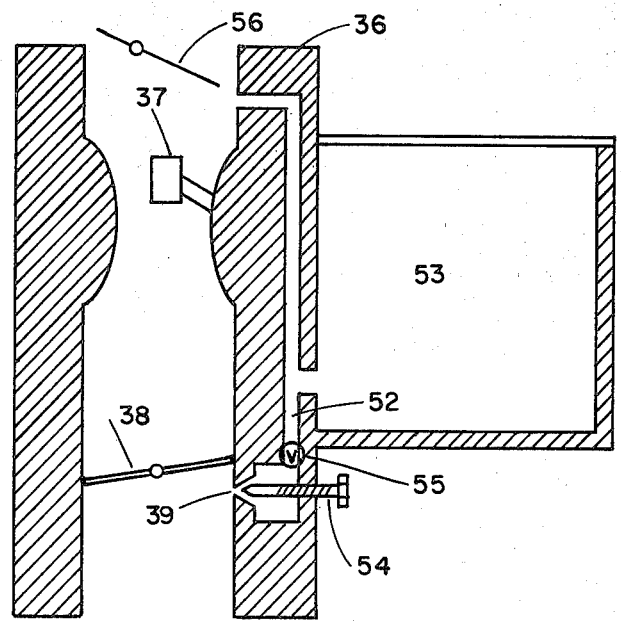
FIG. 4 is a cross-section of a carburetor having a cut-off valve at the idle port.

In the embodiment shown in FIG. 4, carburetor 36 comprises choke valve 56, primary nozzle 37, throttle valve 38, and idle port 39. Needle valve 54 varies the size of idle port 39. Valve 54 is adjusted to provide a rich mixture sufficient to give an idle exhaust gas which would contain 0.5-1.5 percent carbon monoxide in the absence of air injection. Air/fuel ratio of about 14:1 is generally satisfactory. Valve 55 in passage 52 is adapted to close passage 52. Valve 55 is interlocked with throttle valve 38 such that when throttle valve 38 is closed, valve 55 is open and when throttle valve 38 opens enough to induct air/fuel mixture, then valve 55 closes.

Upon starting up of a cold engine, such as shown in FIG. 1, but fitted with the carburetor of FIG. 4, choke valve 56 is closed and valves 25 and 26 are oen to deliver unrestricted air injection. As the engine operates, coolant temperature rises and at about the time choke 56 opens (approximately 150°-180° F. coolant), valve 25 closes restricting air injection to about 5-20 volume percent of inducted air. When the warmed-up engine comes to idle, closing of throttle valve 38 signals valve 55 to open and deliver a rich idle mixture (<14.5:1) air/fuel to the engine. Valve 25 remains closed and the restricted air injection according to the present invention results in an exhaust gas containing about 2-5 volume percent oxygen, most preferably about 3 volume percent oxygen. Restricted air injection of about 5-20 volume percent of inducted air, most preferably 12-15 volume percent, usually results in the proper oxygen level in the exhaust. The rich idle mixture in the absence of air injection would result in an exhaust containing about 0.5-1.5 volume percent carbon monoxide. This high carbon monoxide output is readily oxidized in thermal reactor 19, evolving sufficient heat to keep reactor 19 hot even at idle. This high carbon monoxide at idle in concert with the restricted air injection at idle, maximizes the reactor temperature at idle.

When the accelerator is depressed opening throttle valve 38, valve 55 closes stopping the rich idle mixture. Fuel is then delivered through primary nozzle 37 which has a jet sized to provide an air/fuel ratio of at least 15:5.1, more preferably around 17:1. Air injection remains restricted as at idle to less than 20 percent of inducted air. Because of the high temperature of the thermal reactor at idle, the reactor is immediately effective when the engine returns to normal operation. In the absence of rich idle and restricted air injection, the reactor cools during the idle and upon acceleration there is a time lag before the reactor gets hot enough to have good oxidation efficiency. This results in higher hydrocarbon and carbon monoxide output as measured by the Federal CVS procedures. Lean idle mixture results in cooling because the low carbon monoxide level in the exhaust does not supply enough readily oxidizable fuel value to heat the reactor. Unrestricted air injection cools the reactor by injecting too much cool air. The present invention removes these two factors by providing a rich idle mixture and limited air injection as defined herein. These act in concert to maintain a high reactor temperature such that the reactor is immediately effective when the engine resumes normal operation.

Figure 5:
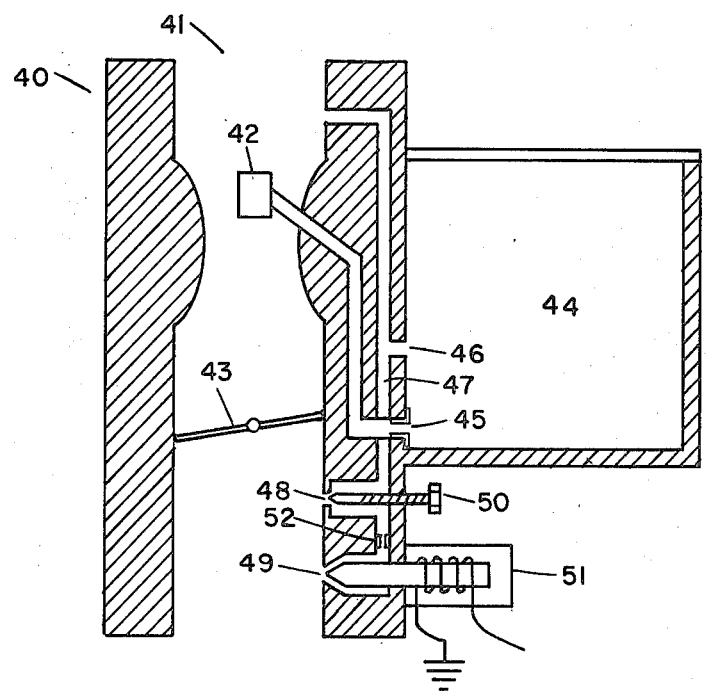
FIG. 5 is a cross-section of a carburetor having dual idle nozzles.
Figure 6:
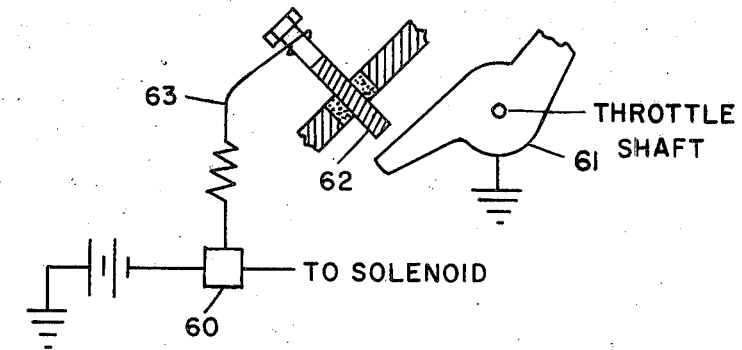
FIG. 6 is a schematic of the idle stop on the throttle control lever of the carburetor of FIG. 5.

In a further embodiment the carburetor has dual idle ports which provide the enriched idle mixture and an automatic cut-off such that air/fuel enrichment stops as soon as the throttle comes off its idle position. This system is shown in FIGS. 5 and 6. Carburetor 40 having primary barrel 41, primary air/fuel nozzle 42, and throttle plate 43 is mounted on an intake manifold (not shown). Fuel bowl 44 is connected through jet 45 to primary nozzle 42. Jet 45 is sized to deliver an air/fuel ratio above about 15.5:1. Fuel bowl 44 is connected through orifice 46 and passage 47 to first idle port 48 and second idle port 49. Needle valve 50 is adapted to adjust delivery of idle mixture through first port 48. Solenoid actuated valve 51 is adapted to open and close second port 49. When open, flow through port 49 is controlled by flow restrictor 52 in passage 47.

Solenoid valve 51 is actuated by a signal from electronic switch 60. When throttle lever 61 is in contact with idle stop 62, switch 60 is grounded through wire 63. Under these conditions, electric current is supplied to solenoid valve 51 opening port 49. When throttle lever 61 is rotated to open throttle plate 43, contact is broken with idle stop 62. Under these conditions, no current is supplied to solenoid valve 51 causing port 49 to close.

Idle mixture is supplied by both ports 48 and 49. Port 48 is adjusted by needle valve 50 to supply a lean idle mixture about the same as that supplied by primary nozzle 42 during normal engine operation, that is above about 15.5:1. This is supplemented by the idle mixture supplied through port 49 which is sized such that the combination of idle mixture supplied by ports 48 and 49 averages rich enough such that the exhaust gas at idle would contain about 0.5-1.5 volume percent carbon monoxide in the absence of air injection. Idle mixture is supplied by both ports 48 and 49 to give an idle mixture rich enough (approximately 14:1) to give idle exhaust containing about 0.5-1.5 percent carbon monoxide in the absence of air injection. Of course, actual carbon monoxide is much lower because limited air injection occurs at idle (about 5-20 volume percent of inducted air) to give a resultant exhaust gas containing about 2-5 volume percent oxygen and very little carbon monoxide.

When the accelerator is depressed, throttle lever 61 is rotated counter-clockwise breaking contact with idle stop 62 such that 63 no longer grounds switch 60. This causes switch 60 to stop supplying current to solenoid 51 closing port 49. Only port 48 now operates causing an immediate leaning of the air/fuel mixture from a rich idle mixture of about 14:1 or less to a lean operating mixture above about 15.1:1.

The reason why the idle mixture is supplied by two nozzles, only one of which shuts off when the throttle comes off idle, is that if only a single idle nozzle is used and it is abruptly closed when the throttle comes off idle there occurs a short period when air flow through the venturi is too low to give full function of primary nozzle 42. During this transition period the engine may hesitate or stall. Having two idle ports which act in concert to supply the rich idle mixture and closing only one when the throttle comes off idle gives the desired leaning of the air/fuel mixture, but prevents hesitation or stalling during the initial acceleration of the engine. However, it is intended that the invention include any system for stopping the enriched idle mixture when the accelerator is depressed including stopping of all idle fuel. In this latter case the primary nozzle and possibly an idle transfer port located above the throttle plate must immediately supply the proper lean air/fuel mixture.

Cold start 1975 Federal CVS Tests were carried out to compare results with the idle cut-off to results without the idle cut-off. The same engine was used in both tests. In the test with the idle cut-off the engine was fitted with a carburetor having dual idle ports substantially as shown in FIG. 5. During the test under idle conditions, with both idle ports open, a rich mixture (approximately 14:1) was inducted such that the exhaust gas in the absence of air injection contained about one percent carbon monoxide. As soon as the throttle lever was moved off idle, the solenoid controlled idle port closed, leaving only the needle valve controlled port operative which at idle would induct a lean (approximately 17:1) air/fuel mixture.

In the test without the solenoid controlled port a carburetor was used which had only a single idle port below the throttle plate as in FIG. 1 which was adjusted by a needle valve to deliver a rich idle mixture (approximately 14:1) such that the idle exhaust in the absence of air injection contained about 1 percent carbon monoxide. This was the only difference between the two tests.

During normal operating modes, the carburetor in both tests inducted a 17:1 air/fuel mixture through a turbulent flow intake manifold as described in U.S. Pat. No. 3,972,324. When the engine was started cold, air injection in both tests was about 40 volume percent of inducted air which gave about 8 volume percent oxygen in the exhaust. As soon as the engine coolant reached 180° F. injected air was restricted to about 10-15 percent of inducted air. At idle, injected air was subject to the same restriction which gave a resultant idle exhaust gas containing 3 percent oxygen.

Exhaust gas recycle was used in both tests to control $NO_x$. EGR did not operate during idle, but functioned at speeds above about 25 mph. When operating, EGR was about 10 percent of inducted air.

The test engine was fitted with a non-catalytic thermal exhaust manifold reactor.

The following table shows the results obtained in a series of cold start 1975 Federal CVS Tests as described above.

|  | Single Idle Port Enriched Idle (g/mi) | | | Dual Idle Ports With Cut-Off (g/mi) | | |
| --- | --- | --- | --- | --- | --- | --- |
|  | HC | CO | $NO_x$ | HC | CO | $NO_x$ |
|  | .095 | 2.33 | 1.75 | .12 | 2.43 | 1.39 |
|  | .14 | 2.25 | 1.30 | .10 | 2.15 | 1.42 |
|  | .13 | 2.28 | 1.49 | .12 | 2.01 | 1.23 |
|  | .11 | 2.58 | 1.23 | .15 | 1.69 | 1.28 |
|  | .14 | 2.96 | 1.18 | .15 | 1.88 | 1.90 |
|  | .15 | 2.92 | 1.30 | .13 | 1.68 | 1.24 |
| avg | .127 | 2.55 | 1.38 | .11 | 1.94 | 1.25 |
|  |  |  |  | .12 | 2.14 | 1.26 |
|  |  |  |  | .14 | 2.06 | 1.35 |
|  |  |  | avg | .126 | 2.00 | 1.31 |

As the test results show, the embodiment having means for leaning the air/fuel mixture delivered by the idle fuel induction system as soon as the engine is accelerated gave a significant reduction in exhaust carbon monoxide compared to a similar embodiment in which the enriched idle mixture was not cut off when the engine throttle was opened.

The above results were obtained in a system having two idle ports below the throttle adjusted such that when both delivered fuel at idle the mixture was rich (i.e. less than 14.5:1) and when one shut off, the idle mixture was lean (i.e. greater than 15.5:1). It will be apparent that these same results can be accomplished by equivalent means which function to change the idle mixture from rich to lean when the throttle is opened. For example, a single idle port can be used which includes a valve which delivers a rich mixture when the throttle is closed and a lean mixture when the throttle is opened, both from the same idle port.

Figure 7:
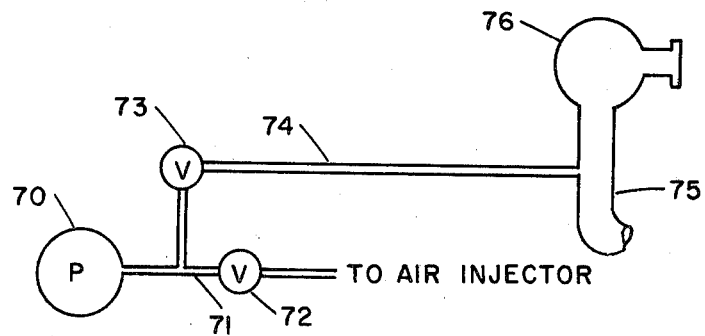
FIG. 7 is a schematic of an air pump having a back pressure relief valve to vent excess air.

As described earlier, the air pump delivers full capacity only during initial warm up. During this time, injected air is about 30-60 volume percent of inducted air. As soon as the engine is warmed up, the injected air is restricted to 0-20 volume percent of inducted air. This causes the air pump to work against a substantial pressure head. In a further embodiment shown in FIG. 7 a pressure relief valve is provided to reduce the pressure head. Air pump 70 delivers air to the air injection system through conduits 71 and valve 72. Valve 72 is of the type shown in FIG. 3. As soon as the engine warms to a predetermined temperature (approximately 180° F. coolant temperature), valve 72 closes restricting air to about 5-20 volume percent of inducted air. This causes the air pump pressure head to rise. Pressure relief valve 73 opens in response to increased pressure and vents excess air to maintain only a 2-3 psig pressure in conduit 71. In order to minimize noise, the excess air leaving valve 73 through conduit 74 is conducted into the engine exhaust pipe 75 downstream from the non-catalytic thermal manifold reactor 76.

We claim:

1. In a spark-ignited internal combustion engine including means for inducing a lean air/fuel mixture having an air/fuel weight ratio above 15.5:1 during normal operation of the engine after warm-up and a non-catalytic thermal exhaust manifold reactor, the improvement comprising:
    (a) means for changing the air/fuel ratio during idle to provide a rich air/fuel mixture such that the resultant idle exhaust gas in the absence of air injection would contain about 0.5-1.5 volume percent carbon monoxide and
    (b) means for injecting a restricted flow of air into the hot engine exhaust gas during normal warmed-up operation and idle close to the exhaust ports in an amount in the range of about 5-20 percent of inducted air at idle so as to maintain an oxidizing reaction in said reactor at idle without cooling said reactor below spontaneous oxidation conditions thereby functioning to substantially lower carbon monoxide and hydrocarbon exhaust emission of automotive engines without use of an exhaust gas catalyst as measured by the 1975 Federal CVS Test Procedure compared to the unimproved engine.

2. An engine of claim 1 wherein said injecting means provides a full capacity flow of air into the exhaust gas during warm-up close to the exhaust ports in an amount in the range of 20-60 percent of inducted air.

3. An engine of claim 1 wherein said air/fuel induction means inducts a rich mixture during idle such that the resultant idle exhaust gas without air injection would contain about one percent carbon monoxide and wherein said air/fuel induction means inducts a lean mixture having an air/fuel ratio above about 15.5:1 during remaining periods of normal warmed-up operation of said engine.

4. An engine of claim 1 wherein said means for injecting air into the hot exhaust gas comprises a main conduit in which there is a valve and a by-pass conduit around said valve, said by-pass conduit containing flow-restrictive means, means for opening said valve in said main conduit when said engine is cold and closing said valve when said engine reaches a predetermined warmed-up temperature, said main conduit and by-pass conduit having a combined capacity to deliver air injection of about 30–60 volume percent of inducted air, said flow-restrictive means in said by-pass conduit limiting air injection to about 5–20 volume percent of inducted air when said valve in said main conduit is closed.

5. An engine of claim 1 wherein said means for injecting air into the hot exhaust gas comprises a conduit containing a valve, said valve having a full-flow capacity when opened and a restricted flow capacity when closed, means for opening said valve when said engine is cold and closing said valve when said engine reaches a predetermined warmed-up temperature, said full-flow capacity being sufficient to deliver air injection of about 30–60 volume percent of inducted air, said restricted flow capacity being sufficient to deliver air injection of about 5–20 volume percent of inducted air.

6. A spark-ignited internal combustion engine including a carburetor, means for injecting air into the hot exhaust gas and an exhaust manifold non-catalytic thermal reactor, said air injection means being adapted to inject air at a rate of 5–20 percent of inducted air during idle, said carburetor having a primary induction barrel including a primary fuel nozzle adapted to form a primary inducted air/fuel mixture having a lean air/fuel weight ratio above about 15.5:1, idle fuel intake means in said primary barrel, said idle fuel intake means comprising a first idle port and a second idle port, said first idle port being adapted to form a lean idle air/fuel mixture having an air/fuel weight ratio above about 15.5:1 and said second idle port being adapted to enrich the idle mixture such that the combination of said first and second idle ports delivers a rich idle air/fuel mixture such that the resultant exhaust gas at idle in the absence of air injection would contain about 0.5–1.5 volume percent carbon monoxide, means for closing said second idle port when said engine is not at idle and opening said second idle port when said engine is at idle.

7. In a spark-ignited internal combustion engine said engine including means for inducting a lean air/fuel mixture having an air/fuel ratio of about 15.5–17:1, means for injecting air into the hot exhaust gas close to the exhaust ports, choke means for enriching said air/fuel mixture when said engine is operating below a predetermined operating temperature, an exhaust manifold non-catalytic thermal reactor and means for inducting a rich air/fuel mixture into the engine cylinders during idle, said rich idle mixture being such that the resultant idle exhaust gas in the absence of air injection would contain about 0.5–1.5 volume percent carbon monoxide wherein said means for injecting air comprises an air pump adapted to inject air through an unrestricted conduit and a restrictive by-pass conduit, valve means in said unrestricted conduit adapted to open when said choke means is enriching said air/fuel mixture and close when said choke means is not enriching said air/fuel mixture, said unrestricted conduit and said by-pass conduit being adapted to inject in combination an amount of air equal to about 30–60 volume percent of inducted air when said valve means is open and said by-pass conduit being adapted to inject an amount of air equal to about 5–20 volume percent of inducted air when said valve means is closed.

8. In a spark-ignited internal combustion engine said engine including means for inducting a lean air/fuel mixture having an air/fuel ratio of about 15.5–17:1, means for injecting air into the hot exhaust gas close to the exhaust ports, choke means for enriching aid air/fuel mixture when said engine is operating below a predetermined operating temperature, an exhaust manifold non-catalytic thermal reactor and means for inducting a rich air/fuel mixture into the engine cylinders during idle, said rich idle mixture being such that the resultant idle exhaust gas in the absence of air injection would contain about 0.5–1.5 volume percent carbon monoxide wherein said means for injecting air comprises an air pump adapted to inject air through an air conduit, valve means in said air conduit wherein when said valve means is open said air pump injects air through said air conduit at a rate equal to about 30–60 volume percent of inducted air, said valve means including a small opening through said valve means such that when said valve means is closed said air pump injects air through said small opening at a rate equal to about 5–20 volume percent of inducted air, said valve means being adapted to open when said engine is below a pre-determined operating temperature and to close when said engine is above said pre-determined operating temperature wherein the combination of inducting said rich air/fuel mixture during idle and injecting air at a rate of about 5–20 volume percent of inducted air functions to substantially lower the amount of carbon monoxide and hydrocarbon in the engine exhaust gas as measured by the 1975 Federal CVS Test Procedure.

* * * * *

UNITED STATES PATENT AND TRADEMARK OFFICE
CERTIFICATE OF CORRECTION

PATENT NO. : 4,395,876
DATED : August 2, 1983
INVENTOR(S) : Frederick J. Marsee et al It is certified that error appears in the above—identified patent and that said Letters Patent is hereby corrected as shown below:

Column 7, line 15, reads "oen", and should read -- open --.

Column 12, line 20, reads "aid", and should read -- said --.

Signed and Sealed this

Twenty-seventh Day of December 1983

[SEAL]

Attest:

GERALD J. MOSSINGHOFF

Attesting Officer

Commissioner of Patents and Trademarks